United States Patent

[11] 3,609,668

[72] Inventors Jacques Georges Dupieux
Issy-les-Moulineaux;
Bernard Pierre Jean Durteste, Sevres;
Francis Emmanual Jean Robert, Boulogne-Billancourt, France; Jean-Pierre Le Corre, deceased, late of Sainte-Genevieve-des-Bois, France by Yvette Marie Laurence Le Corre, administrator, Sainte-Genevieve-des-Bois, France

[21] Appl. No. 22,105
[22] Filed Mar. 5, 1970
[45] Patented Sept. 28, 1971
[73] Assignee International Standard Electric Corporation
New York, N.Y.
[32] Priority Mar. 6, 1969
[33] France
[31] 6906194

[54] PATH SEARCH CIRCUIT
6 Claims, 28 Drawing Figs.

[52] U.S. Cl. .................................................. 340/172.5, 179/18.7

[51] Int. Cl. .................................................. H04m 7/00
[50] Field of Search .................................................. 340/172.5, 166; 179/18.7

[56] References Cited

UNITED STATES PATENTS

| | | | |
|---|---|---|---|
| 3,129,407 | 4/1964 | Paull | 340/147 |
| 3,204,038 | 8/1965 | Seemann et al. | 174/18 |
| 3,462,743 | 8/1969 | Milewski | 340/172.5 |
| 3,480,913 | 11/1969 | Sherstiuk | 340/166 |

*Primary Examiner*—Gareth D. Shaw
*Attorneys*—C. Cornell Remsen, Jr., Walter J. Baum, Percy P. Lantzy, J. Warren Whitesel, Delbert P. Warner and James B. Raden

ABSTRACT: Scanning and path search circuits are provided in a switching exchange involving time division multiplex data and more particularly in an exchange employing pulse code modulation.

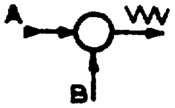
Fig.1.a
Fig.1.b
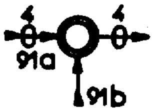
Fig.1.c
Fig.1.d
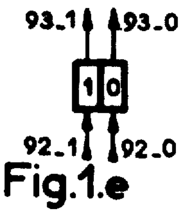
Fig.1.e
Fig.1.f
Fig.1.g
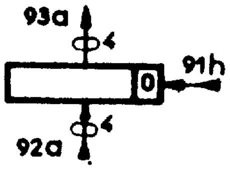
Fig.1.h
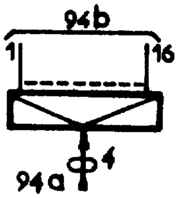
Fig.1.i
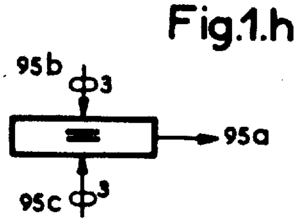
Fig.1.j
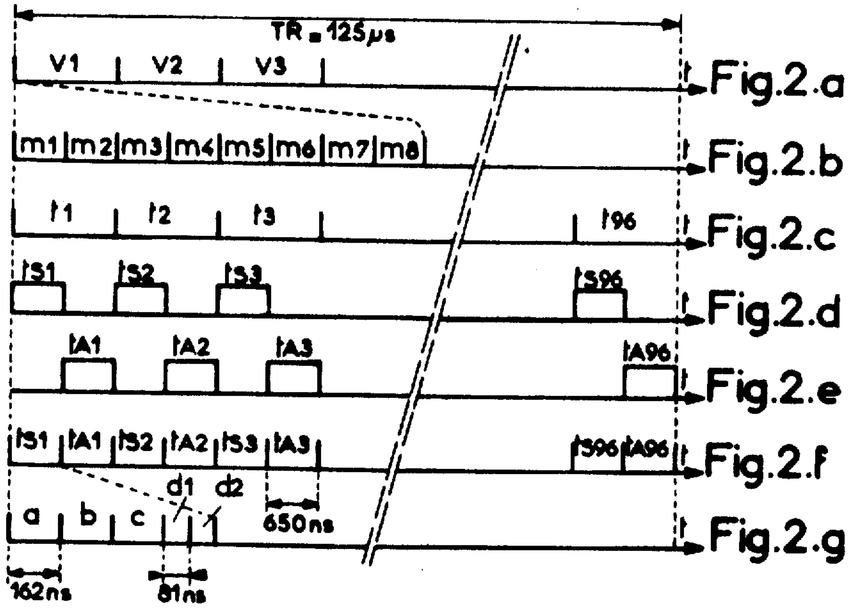
Fig.2.a Fig.2.b Fig.2.c Fig.2.d Fig.2.e Fig.2.f Fig.2.g
*Inventor*
J.G. Dupieux et al
6-2-1-14
By D. [signature]
*Attorney*

PATH SEARCH CIRCUIT

The present invention concerns scanning and path search circuits in a time multiplex data switching exchange, and more particularly in an exchange of this type operating in pulse code modulation.

In the case J. G. DUPIEUX et al. 5-1-13-1, U.S. Pat. application Ser. No. 7,477 filed Feb. 2, 1970 for Time Multiplex Switching Center, a data switching exchange has been described in which the telephone operations such as detection of new calls, the reception of the dialling digits and its interpretation, the search of a free path in the switching network between an incoming channel and an outgoing channel were carried out by a data processing machine.

It is however understood that for reasons of time and of cost, it may be interesting to discharge the data processing machine of a certain number of functions.

The object of the present invention is thus to make provision for circuits carrying out certain scanning operations and certain search and path identification operations.

In a time multiplex data switching exchange operating in pulse code modulation in which the operations are controlled by a data processing machine, the said switching exchange comprising a switching network, circuits of group of *p*-trunks or junctions or highways, if *p* is the number of digits of each channel message, connected to the inputs of the switching network and provided for carrying out, on reception, a series parallel conversion and, on the transmission, the parallel series conversion of digits of the messages of channels of the *p*-trunks, detection and interpretation circuits of signalling digits associated to each circuit of group of *p*-trunks comprising mainly a signalling memory in which are stored for each channel of the group the expected signalling state and the indication of change or nonchange of the signalling state with respect to the expected signalling state, junctor data memories connected to the outputs of the switching network, each junctor comprising, in addition to a data memory, a time path memory and space path memories provided for setting up a connection between two channels, the said memories being updated by the data processing machine in relation with the communications in course, a clock circuit provided for supplying cyclic signals, the scanning and path search circuits which are the object of the present invention comprise means for cyclic reading of the signalling memories and of the time and space path memories, means associated to each signalling memory enabling to detect, on the one hand, the new calls and, on the other hand, the changes of state of the signalling other that the new calls, means associated to each *p*-junction group circuit enabling to detect the trunks which are out of service, means for receiving and for decoding information sent by the data processing machine, means associated to space path memories enabling to compare the space codes read on a cyclic way in the said memory to the space code sent by the data processing machine, means for receiving selectively the signals coming (a) from means associated to the signalling memories corresponding to the same switch (b) from *p*-junction group circuits connected to a same switch and (c) from the space and time path memories corresponding to a same switch, means for processing the signals received selectively from the above associated circuits in relation with the information supplied by the data processing machine, the said means supplying the information required by the data processing machine.

The above-mentioned and other features and objects of this invention will become apparent by reference to the following description taken in conjunction with the accompanying drawings in which:

FIGS. 1.*a* to 1.*j* illustrate the symbols used in the following figures;

FIGS. 2.*a* to 2.*g* illustrate the diagrams of the clock signals;

Figure 3:
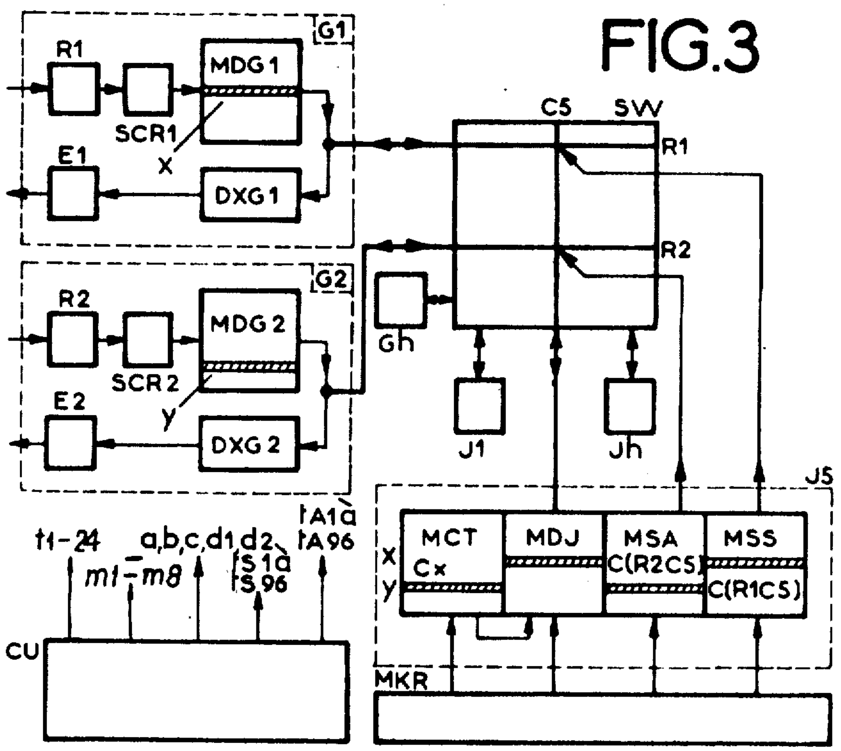
FIG. 3 represents the block diagram of a switching central exchange operating in time multiplex and in pulse code modulation.

FIGS. 1.*a* to 1.*j* give the meaning of certain symbols used particularly in the drawings of the present patent.

FIG. 1.*a* illustrates a coincidence electronic gate called simple AND circuit, which supplies a positive signal on its output when its inputs, represented by arrows touching the circle, receive simultaneously a positive signal. If we call A and B the signals which are present on each one of the two input terminals, this circuit achieves the logical condition noted A.B.

FIG. 1.*b* illustrates a mixing electronic gate, called OR circuit, which supplies a positive signal on its output when a positive signal is applied at least on one of the input terminals represented by the arrows touching the circle. If one calls C and D the signals which are present on each one of the two input terminals, this circuit achieves the logical condition noted C+D.

FIG. 1.*c* illustrates a multiple AND circuit, i.e. comprising, in the case of the example, four AND circuits one of the input terminals of which is connected to each one of the conductors **91*a* and the second input terminal of which is connected to a common conductor 91*b***.

An input of a AND circuit will be said to be activated or energized when a signal is applied on the said input and that the AND circuit is conductive if all its inputs are simultaneously activated.

FIG. 1.*d* illustrates a multiple OR circuit which comprises in the case of the example, four OR circuits having two inputs **91*c* and 91*d* and which delivers, over the four output terminals 91*e***, the same signals as those applied over said input terminals.

FIG. 1.*e* illustrates a bistable circuit or "flip-flop" to which a control signal is applied on one of its inputs 92–1 or 92–0 in order to set it respectively to the 1 state or to the 0 state. A voltage of the same polarity as the control signals is present, either on the output 93–1 when the flip-flop is in the 1 state, or on the output 93–0 when it is in the 0 state. If the flip-flop is referenced B1, the logical condition characterizing the fact that it is in the 1 state will be written B1, the one characterizing the fact that it is in the 0 state will be written $\overline{B1}$.

FIG. 1.*f* illustrates a group of several conductors, five for the example considered.

FIG. 1.*g* illustrates a multiplexing of conductors so that, in the shown example, 10 output conductors **94*j* are connected in parallel to the same input conductor 94*h***.

FIG. 1.*h* illustrates a flip-flop register. In the case of the figure; it comprises four flip-flops the 1 inputs of which are connected to the conductors of group **92*a* and the 1 outputs of which are connected to the group of the conductor 93*a*. The digit 0 located at one end of the register means that this latter is reset or clear when a signal is applied to the conductor 91*h***.

FIG. 1.*i*. illustrates a decoder circuit which, in the shown example converts a four-digit binary code group applied over the group of conductors 94a into a 1 out of 16 codes, so that a signal appears on only one among the 16 conductors 94b for each one of the code groups applied to the input.

FIG. 1.*j* illustrates a code comparator which delivers a signal over its output terminal 95a when the three-digit code groups applied over its terminals 95b and 95c are identical.

In the course of the description, it will be used frequently the reference of a signal preceded by the letter C in order to designate the binary code the decoding of which supplies the said signal. Thus CV1 designates the code to which corresponds the signal VI.

Last, it will be noted, that in the different figures enclosed to the description, the electronic gates (AND circuits, OR circuits) do not bear references. In fact, each one of these gates is identified without ambiguity in the description by the logical equation describing the function it performs and by the number of the figure, the reference of each elementary signal applied to it being shown near the corresponding input. Thus, the AND circuit of FIG. 1.*a* would be defined as the logical circuit supplying a signal Wv for the logical condition A.B (FIG. 1.*a*).

FIGS. 2.*a* to 2*g* represent the diagrams of the clock signals of the PCM central exchange and the table *I* gives the definition of them.

In the course of the description cases will be mentioned; these cases are listed below and will be mentioned in the description by the lettered reference of the said list:

a. case M. J. Herry et al. 3–2 b. Case J. G. Dupieux et al. 5–1–13–1 c. Case B. P. J. Durteste et al. 1–2–2.

A way of achievement of a time multiplex data switching central exchange and more particularly a central exchange of this type operating in pulse code modulation or PCM, has been described in the case (*b*).

This improved switching central exchange comprises (FIG. 3):

- a switching network SW shown under a matrix form and comprising for example *h* rows R and *h* columns C. Only the rows R1, R2 and the column C5 have been shown on the figure and the corresponding cross-points have been referenced R1C5 and R2C5.
- *h* circuits of group of junctions G1 to G*h*;
- *h* junctors J1 to *jh*;
- a marker circuit MKR having access to all the junctors. The marker circuit is in fact a data processing machine provided for setting up the communication between two channels ending at the central exchange. Owing to the number of operations to be carried out for setting up the communications simultaneously, it is usually provided to associate peripheral units to the data processing machine, the said peripheral units carrying out certain operations; the same goes for the scanning and path search circuits which are the object of the present invention. In the continuation of the present description and in the claims, the expressions of marker circuits, of data processing machine or even of computer will be used indifferently.
- a clock unit CU which supplies the signals defined in table 1 and the FIGS. 2.*a* to 2.*g*.

Each junctions group circuit such as G1 comprises:

- a receiving circuit R1 of the messages received over *p*=8 incoming lines;
- a synchronization circuit SCR1;
- a group data memory MDG1 comprising *g*=*p*×*m*=192 lines; this memory is selected on a cyclic way under the control of the signals *t*S;
- a demultiplexing circuit DXG1 of the messages coming from the switch SW;
- a transmission circuit E1 of the messages to which are connected *p*=8 outgoing lines;

Each junctor such as J5 comprises mainly a certain number of memories of *g*/2=96 lines, which are:

- a speech memory MDJ;

TABLE 1.—CHARACTERISTICS OF THE PCM SYSTEM AND OF THE CLOCK SIGNALS (EXCHANGE TIME) BASE HS)

| Symbol | Unit duration | Cycle duration | | Figure |
|---|---|---|---|---|
| TR | 125 μS. | | Duration of the repetition period or frame (sampling frequency: 8 kc.). | 2.a |
| M | | | Number of channels in a junction (m=24). | |
| V1, V2 . . . V24. | ≅5.2 μs. | 125μs. | Channel time slot | 2.a |
| P | | | Number of digits of a message and number of junctions in a group (p=8). | |
| m1, m2 . . . m8. | 650 ns. | 5.2 μs. | Digit time slot | 2.b |
| t1 . . . t96 | 1,300 ns. | 125 μs. | Base time slot | 2.c |
| t'1 . . . t'192 | 650 ns. | 125 μs. | Half base time slot | |
| Ct | | | Set of 96 base time-slot codes. | |
| Ct' | | | Set of g=192 half base time slot codes. | |
| tS | 650 ns. | | Synchronous time slots | 2.d |
| tA | 650 ns. | | Asynchronous time slots | 2.e |
| tS1 . . . tS96 | 650 ns. | 125 μs. | Interlaced sets of signals tS and tA. | 2.f |
| tA1 . . . tA96 | 650 ns. | 125 μs | | |
| a, b, c, d | 162.5 ns. | 650 ns. | Fine time slot signals | 2.f |
| a1, a2 (d1, d2) | ≅81 ns. | 162.5 ns. | Ultra-fine time slot signals dividing a signal (d) into 2 equal time slots. | 2.g |
| Ct. tS | | | Cyclical selection at synchronous time slots tS. | |
| Ct. tA | | | Cyclical selection at asynchronous time slots tA. | |

- a time path memory MCT;
- a synchronous space path memory MSS;
- an asynchronous space path memory MSA;

The switching network of FIG. 3 is provided in order to establish connections between *h* groups of junctions G1 to G*h* comprising each one *g*=192 channels, each connection being set up through a junctor among *h*. Such a connection is constituted by two half-connections which connect respectively to the junctor the incoming channel and the outgoing channel; one of these half-connections being set up at a synchronous time slot *t*S and the other one at an asynchronous time slot *t*A the order numbers of which being generally different. A connection necessitates the carrying out of a time switching in the junctor and of two space switchings (one per half-connection) in the switching network SW.

The time switch is constituted by the combination in a junctor of a speech memory MDJ and of a time path memory MCT. The addressing of the speech memory is carried out in a cyclic way under the control of the signals *t*S and in an acyclic way at the time *t*A under the control of the address code supplied by the time path memory MCT the selection of which is also cyclic.

The space switch is constituted by the switch SW with electronic cross-points controlled either by synchronous space path memories MSS when it is required to set up a synchronous half-connection, or by asynchronous space path memories MSA when it is required to set up an asynchronous half-connection. Such a switch enables to carry out the connection between groups of different junctions such as G1 and G2.

The time and space switching will be quickly described for a connection between the channel *x* of the group G1 (half-connection G1:*t*S*x*) and the channel *y* of the group G2 (half-connection G2:*t*A*y*), this connection using the junctor J5 (abbreviation of the connection G1:*t*S*x*/J5/G2:*t*A*y*).

The marker circuit MKR allocates to this connection to this connection the line *x* of the junctor J5 and writes on the line *y* of the memory MCT the code C*x* defining the address *x* of the memory MDJ. The marker circuit writes also in the line *x* of the synchronous space path memory MSS the code C(R1C5) permitting the selection in the switch SW of the cross-point R1C5. It writes also in the line *y* of the asynchronous space path memory MSA the code c(R2C5) permitting the selection in the switch Sw of the cross-point R2C5.

At the time slot $tSx$, the information contained in the lines $x$ of the memories MDJ, MDG1 and MSS permits the setting up of the half-connection G1:$tSx$. This latter is made by a transfer in both directions of data between the junctor J5 and the group G1, vizus, first the transfer of information contained in the line $x$ of the memory MDJ towards the demultiplexing circuit DXG1, afterwards the transfer of the contents of the line $x$ of the memory MDG1 in the line $x$ of the memory MDJ. It will be observed that two messages are written in each line of the memory MDG1, one of the messages is transferred during the synchronous time slot $tSx$ (synchronous half-connection) and the other one is transferred during the asynchronous time slot $tAx$ (asynchronous half-connection).

At the time slot $tSy$, the line $y$ of the memory MCT is selected again and the code $Cx$ which is read controls again the selection at the time slot $tAy$ of the line $x$ of the memory MDJ; the line $y$ of the memory MSA is also selected at the time slot $tSy$ and the code C(R2C5) permits the closing at the time $tAy$ of the cross-point R2C5 used for the half-connection G2:$tAy$. This latter consists first in a transfer of the contents of the line $x$ of the memory MDJ in the multiplexing circuit DXG2 then in a transfer of a message of the line $y$ of the memory MDG2 in the line $x$ of the memory MDJ.

It is therefore seen that the time switch enables to match the time position of the incoming and of the outgoing channels by delaying the information received from G1 from the time slot $tSx$ to the time slot $tAy$ and by delaying the one received from G2 from the time slot $tAy$ to the time slot $tAx$.

Figure 4:
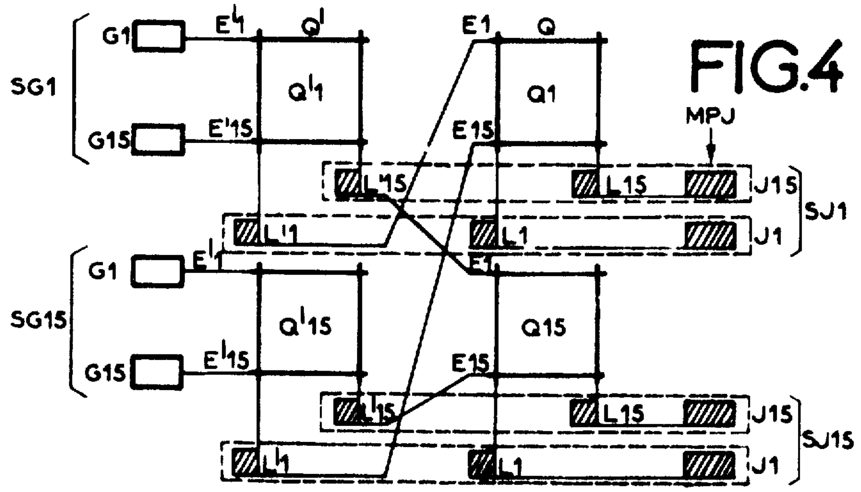
FIG. 4 represents the diagram of interconnection between the two stages as well as the organization of the space path memories.

As it has been mentioned with relation to FIG. 4, the group data memory MDG is read in a cyclic way at $g/2$=96 synchronous time slots. But, this memory receives $g$ messages per cycle TR, so that each reading must enable to read two messages. This group data memory is organized in such a way as at each reading one has staticized on the output registers RG1 and RGP (FIG. 5) two messages corresponding the one to a channel of one odd junction (register RGI) and the other one to the homologous channel of an even junction (register RGP). The message of a channel of an odd junction is processed during a synchronous time slot $tS$ whereas the message of a channel of an even junction is processed during an asynchronous time slot $tA$.

The switching circuit of FIG. 3 comprises a switching network SW with a single stage. FIG. 4 represents a switching circuit which comprises a switching network with two stages Q and Q', each stage having for instance 15 switches with 15 inlets and 15 outlets. The outlets or verticals L' of the first stage Q' are connected to the inlets or horizontals E of the second stage Q in such a way as each switch of one stage may have access to all the switches of the other stage. The inlets or horizontals E' of the stage Q' are connected to the equipments of group G and the assembly of the group equipments which are connected to the same switch Q' will be called supergroup SG. The outlets or verticals L of the stage Q are connected to the junctors J and the assembly of the junctors which are connected to a same switch Q will be called superjunctor SJ. In the continuation of the present description, a connection such as L'1E1 will be called link.

A synchronous space path memory and an asynchronous space path memory are associated to each vertical of a switch. These memories, in the same way as the memories MSS and MSA of FIG. 3, comprise each one $g/2$ lines which are selected on a cyclic way by the synchronous time slot signals $tS$; the code contained in a line $x$ of a memory of a space path memory identifies the cross point of the vertical to which the said memory is associated which will have to be closed at the time $tSx$ or at the time $tAx$ according to whether respectively a synchronous or an asynchronous memory is involved. The fact that no cross-point is selected at the half base time slot $tx$ is shown by a particular code, for instance the code 0000, the decoding of which does not correspond to any cross-point.

With such a switching network, we understand easily that the up of a half-connection requires the access to two space path memories, either synchronous or asynchronous, one associated to one vertical of a switch of the stage Q' and the other one associated to one vertical of a switch of the stage Q. In order to simplify the access to these memories, they are for instance grouped as shown on FIG. 4. This grouping has been described in the case (b). Thus, the space path memories associated to the verticals L'1 and L1 of the switches Q'1 and Q1 are grouped and associated to the memories MCT and MDJ of the junctor SJ1–J1. This grouping is called horizontal grouping. In a junctor, the synchronous space path memories, associated to the stage Q and to the stage Q' will be respectively called MSS and MSS', the asynchronous space path memories associated to the stage Q and to the stage Q' will be respectively called MSA and MSA'.

For a call, the first operation to be carried out by the central exchange is the detection of this call; the following operation consists in detecting the dialling digits which are transmitted by the changes of state (opened or closed) of the line of the calling subscriber; when the dialling number of the called subscriber is known, the following operation consists in searching a free path in the central exchange between the calling subscriber and the called subscriber. If a free path exists, it is set up as described in relation with FIG. 3. When the conversation is completed, the memories have to be updated and for this purpose the path used from the incoming channel assigned to the called subscriber is to be known, this operation of search of the used path is called path identification.

The detection operations of a call, of path search and path identification as well as others, are carried out by the circuit object of the present invention under the control of signals of nine programs referenced P16 to P24, the said signals being supplied by the data processing machine which supervises the whole of the circuits of the central exchange. The table 2 gives the meaning of the different programs. We shall notice that the programs P20 to P24 concern scannings whereas the programs P16 to P19 concern a path search or a path identification. These programs are coded under the form of a four-digit code which is, for instance, supplied by the data processing machine which controls the central exchange.

It will be also observed that the search of a free link L' and the identification of a busy link L' are two identical operations carried out under the control of a same signal of program, vizus the signal P16 when each $p$-junction group circuit is connected to the two inlets of the switching network or the signal P17 when each $p$-junction group circuit is connected to a single inlet of the switching network. This last mode of connection is the one of FIGS. 3 and 4 and, in this case, as it has been mentioned previously, the message of a channel of an odd trunk is processed during a synchronous time slot $tS$ whereas the message of an even trunk is processed during an asynchronous time slot $tA$. In the first mode of connection, which has been described in the case (b), each one of the two messages read in a same line of the group memory may be processed selectively, at a synchronous time slot or at an asynchronous time slot.

TABLE 2

| Programs | Meaning |
|---|---|
| P16 | Search of a free link L' or identification of a busy link L' between a switch of the stage Q' and a switch of the stage Q at a given synchronous or asynchronous time t'x in the case where each p-junction group circuit slot is connected to two inlets of the switching network. |
| P17 | Search of a free link L' or identification of a busy link L' between a switch of the stage Q' and a switch of the stage Q at a given time slot t'x in the case where p-junction group is connected to a single inlet of the switching network. |
| P18 | Search of a free path between a free link at a time slot t'x and one of the allowed outgoing channels at one of the time slots t'y. |
| P19 | Identification of the junctor and of the time slot t'y used for connecting a link, used at the time t'x, to an outgoing channel. |
| P20 | Detection of new calls. |
| P21 | Detection of the desynchronized trunks. |
| P22 | Detection of the highways in which the alternate Mark Inversion rule of the message signals has been infringed. |
| P23 | Detection of the highways in which the average phase signals are no longer elaborated. |
| P24 | Detection of the change of state of the signalling signals. |

Figure 8:
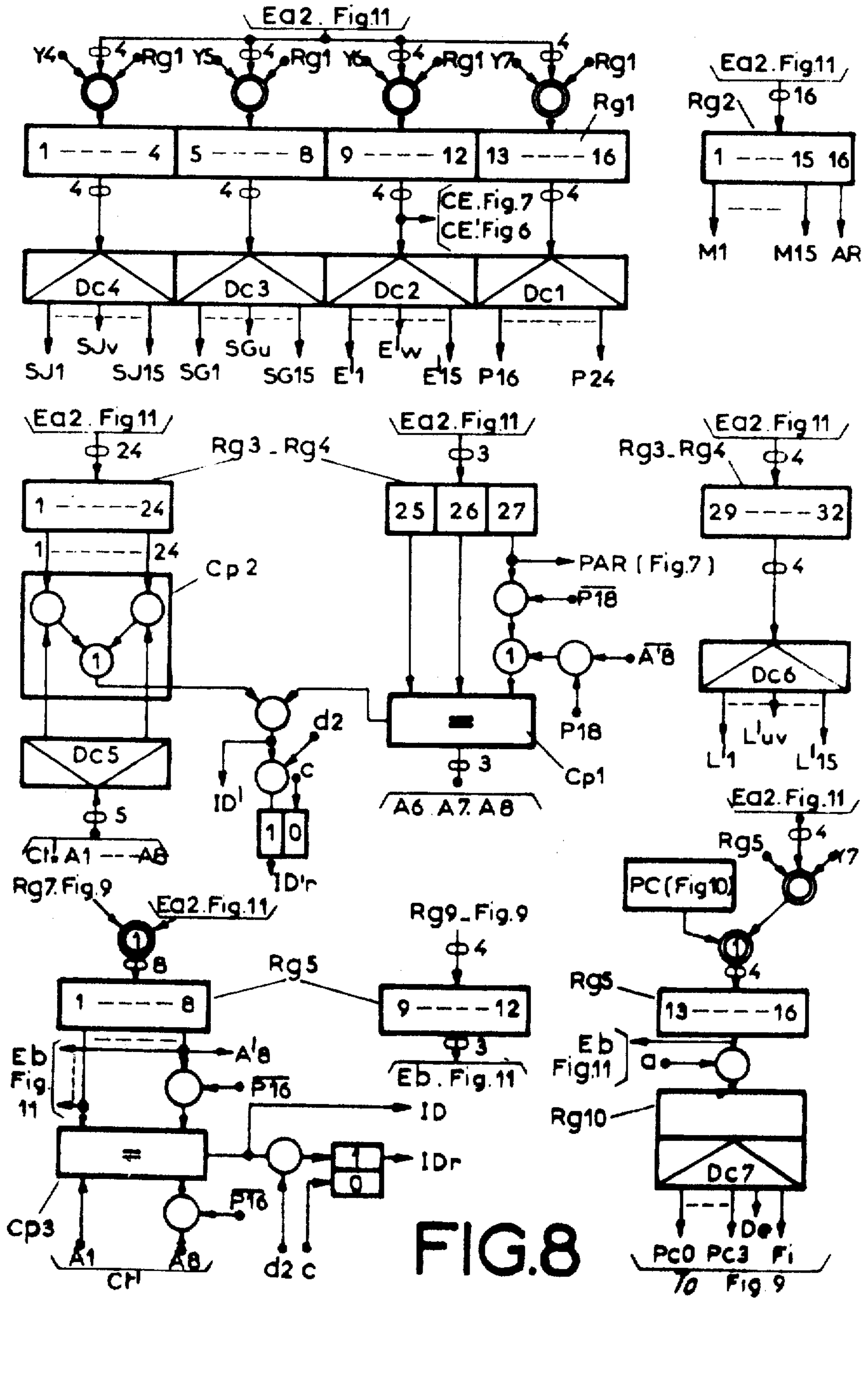
FIG. 8 represents the registers and their associated circuits which enable to control the scanning and path search circuits.
Figure 11:
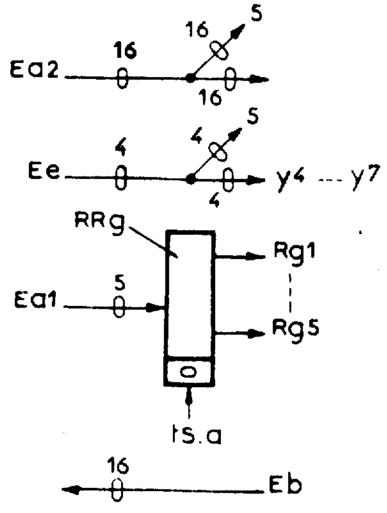
FIG. 11 represents the assembly of conductors coming from the control computer.

The codes of programs as well as the other pieces of information which are necessary are supplied by the data processing machine under the form of five 16-digit words which are recorded in the five registers Rg1 to Rg5 of the circuit of FIG. 8. The 16 digits of each word are transmitted by the group of conductors Ea2 (FIG. 11). The choice of one of the five registers is obtained through the code one out of five staticized on the register RRg the inlets of which are connected to the group of five conductors Ea1. This code for choosing one register is sent at a synchronous time slot but is only used at the following asynchronous time slot during which the word of 16 digits is sent. During the asynchronous time slot, the computer sends also, over the group of four conductors Ee, the writing orders Y4 to Y7 of the parts of words of four digits each. In order not to overload FIG. 8, only the incoming circuits of the register Rg1 have been shown, but it is to be understood that the other registers have the same inlet circuits.

TABLE 3

| Registers | Digits | Meaning |
|---|---|---|
| Rg1 | 1 to 4 | Code of the superjunctor CSJ. |
| | 5 to 8 | Code of the supergroup CSG. |
| | 9 to 12 | Space code CE or CE'. |
| | 13 to 16 | Program code. |
| Rg2 | 1 to 15 | Mask of the allowed groups, links or junctors. |
| | 16 | The circuit may or not call the computer at the end of a program. |
| Rg3 and Rg4. | 1 to 16 | Mask of the allowed outgoing channels. |
| | 17 to 24 | |
| | 25 to 27 | Allowed highway. |
| | 28 | Not used. |
| | 29 to 32 | Space code CL' of the link. |
| Rg5 | 1 to 8 | Time code Ct' written by the computer or time code of the result. |
| | 9 to 12 | Space code of the result. |
| | 13 to 16 | State of the sequential. |

Table 3 gives the meaning of the different groups of digits. The decoder circuit Dc1 is associated to the four flip-flops 13 to 16 of the register Rg1 and supplies one of the signals of program P16 to P24. The state signals of the four flip-flops 9 to 12 of the register Rg1 are applied, on the one hand, to the decoder circuit Dc2 which supplies one of the signals E'1 to E'15 corresponding to an inlet of a switch and, on the other hand, to the comparator circuits C'p and Cp of FIGS. 6 and 7. The decoder circuit Dc3, associated to the four flip-flops 5 to 8 of the register Rg1, supplies the signals of selection SG1 to SG15 of one of the supergroups. The decoder circuit Dc4 associated to the four flip-flops 1 to 4 of the register Rg 1 supplies the signals of selection SJ1 to SJ15 of one of the superjunctors.

The state signals M1 to M15 of the flip-flops 1 to 15 of the register Rg2 are used as a mask in order to forbid the choice of certain groups, links or junctors during the different programs. The signal of the 16th flip-flop of the register Rg2 is used for informing the circuit object of the present invention that the data processing machine either requests or not to be called as soon as a result has been obtained.

The registers Rg3 and Rg4 are grouped in one single register of 32 flip-flops. The flip-flops 25 to 27 store the code of the allowed outgoing junction for carrying out a connection and the flip-flops 1 to 24 store the mask of the allowed outgoing channels in the said junction. This information is used during the program P18 the aim of which (table 2) is to search a free path between a free link at the time slot $t'x$ and one of the allowed outgoing channels, each one of the outgoing channels corresponding to a certain clock time $t'y$. It is thus understood that it is necessary, at each allowed time slot $t'Y$, to determine if a free path exists between the free link at the time slot $t'x$ and the allowed outgoing channel. The different allowed time slots $t'y$ are obtained by comparison of the clock code $Ct'$ formed by the eight digits A1 to A8 to the different codes of the allowed outgoing channels. To this effect, provision has been made for a first comparator Cp1 (FIG. 8) receiving, on the one hand, the signals of the digits 25 to 27 of the registers Rg3–Rg4 and on the other hand the signals A7 and A8 of the clock code $Ct'$; provision has also been for a decoder Dc5 of the digits A1 to A5 of the code $Ct'$, the code 1 out of 24 appearing over the 24 outputs of the decoder Dc5 being compared to the code constituted by the digits 1 to 24 of the registers Rg3–Rg4. This comparison is carried out through a multiplicity of 24 AND circuits, an AND circuit per each channel, the two input of which are connected to the corresponding outputs at the same channel of the registers Rg3–Rg4 and of the decoder Dc5. The outputs of the circuits are connected to a same OR circuit the signal of which means that there is identity. Thus, if the code of mask is 11 followed by 22 zeros (channels 1 and 2 allowed), there will be identity for the two clock codes $Ct'$ which supply after decoding the code constituted by the digit 1 followed by zeros and to the code 01 followed by zeros. The identity signals supplied by the comparator circuits Cp1 and Cp2 are applied to an AND circuit the output signal of which means that the clock code A1 to A8 corresponds to one of the allowed channels in a determined trunk. In order to respect certain durations, this identity signal ID' is delayed by one digit time slot through a flip-flop set to the 1 state at the ultrafine time slot $d2$ and set to the 0 state at the fine time slot $c$; the delayed signal will be referenced ID'r.

The flip-flops 29 to 32 of the registers Rg3–Rg4 staticize the code CL' of the link which must be used for connecting a junctor to an outgoing channel (program P18). The decoder circuit Dc6 associated to these flip-flops supplies the selection signals L'1 to L'15.

The flip-flops 1 to 8 of the register Rg5 staticize the code of the incoming channel for which a free path is searched. The code is compared, in a circuit Cp3, to the clock code $Ct'$; when there is identity, the comparator supplies a signal ID which is staticized at the ultrafine time slot $d2$ in a flip-flop, the said flip-flop being reset at the ultrafine time slot $c$; in this way, the signal ID, in the same way as the signal ID', is delayed for being used at the following time slot: it is then referenced IDr. When each one of the group circuits G is connected to only an inlet E' of a switch (FIG. 4), the eight digits of each code must be compared. However, it has been described in the case (b) a different organization which consists in connecting each group circuit to two inlets E' of a same switch. Such an organization allows that each one of the two messages read in a same line of the group data memory to be transferred, selectively, at a synchronous time slot or at an asynchronous time slot. In order to take into account such an organization, the comparison for the program P16, is limited to the seven most significant digits in such a way as the signals ID and IDr last two digit time slots.

Figure 9:
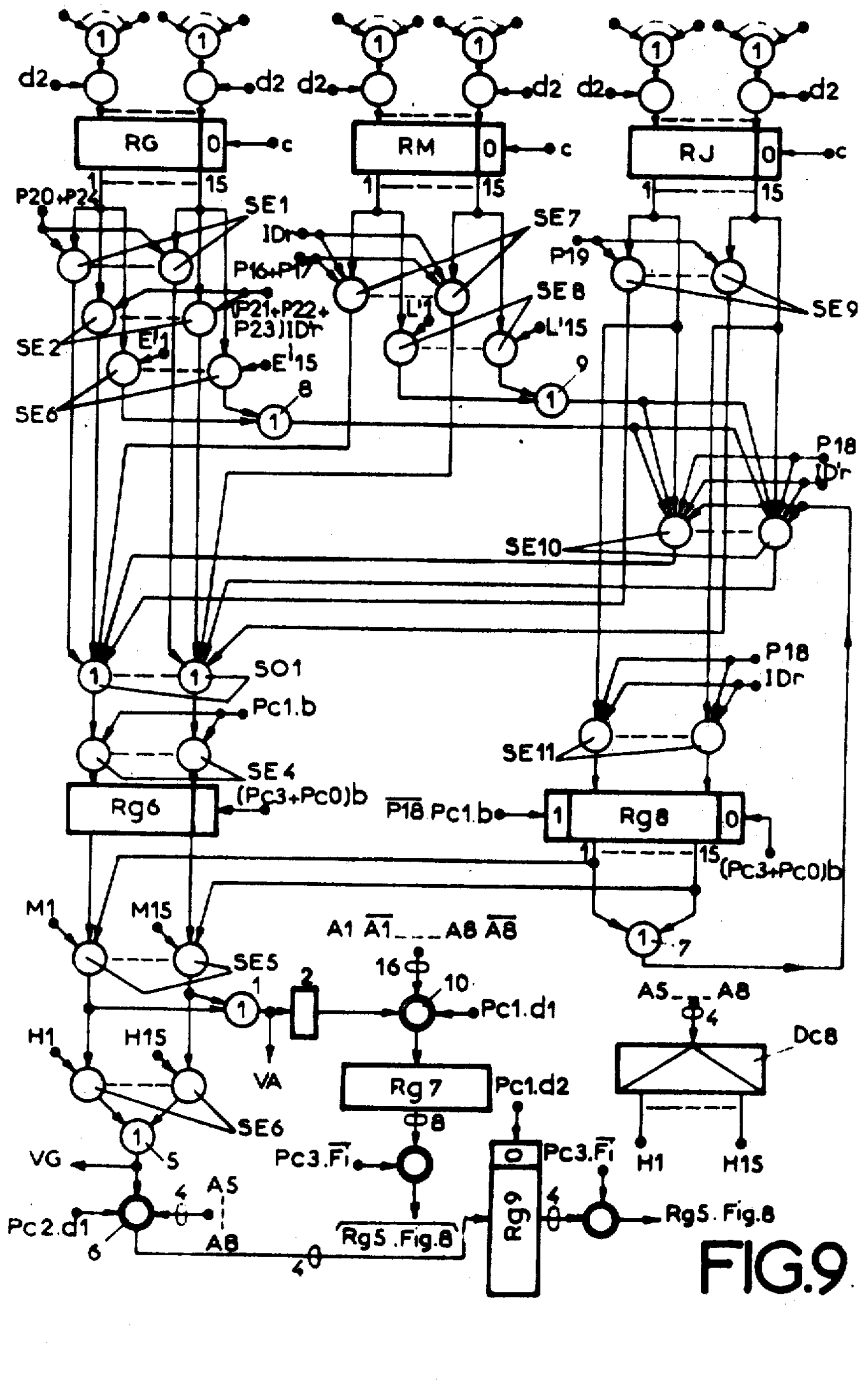
FIG. 9 represents the selection logic circuit.

The flip-flops 1 to 8 of the register Rg5 are used also for receiving the time code which results from the search supplied by the register Rg7 of the circuit of FIG. 9.

The flip-flops 9 to 12 of the register Rg5 are used for staticizing the space code resulting from the search supplied by the register Rg9 of the circuit of FIG. 9.

Figure 10:
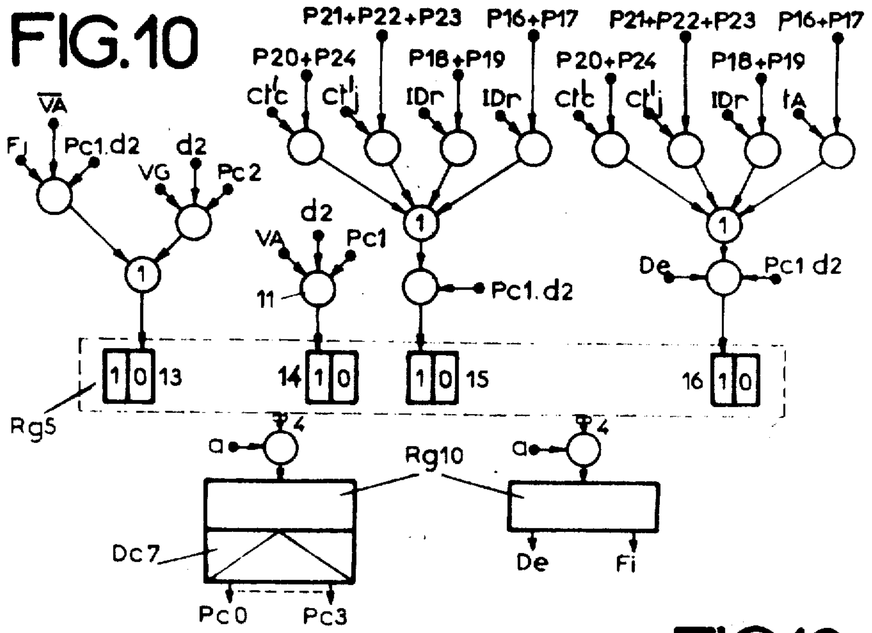
FIG. 10 represents the sequential circuit of control of the different phases of the logical circuit of FIG. 9.

The flip-flops 13 to 16 of the register Rg5 are used for staticizing the codes of the different phases of the sequential circuit; at the starting of a program, the data processing machine staticizes therein the code 1,000, the other codes are staticized by means of signals supplied by the sequential circuit PC of FIG. 10.

Figure 5:
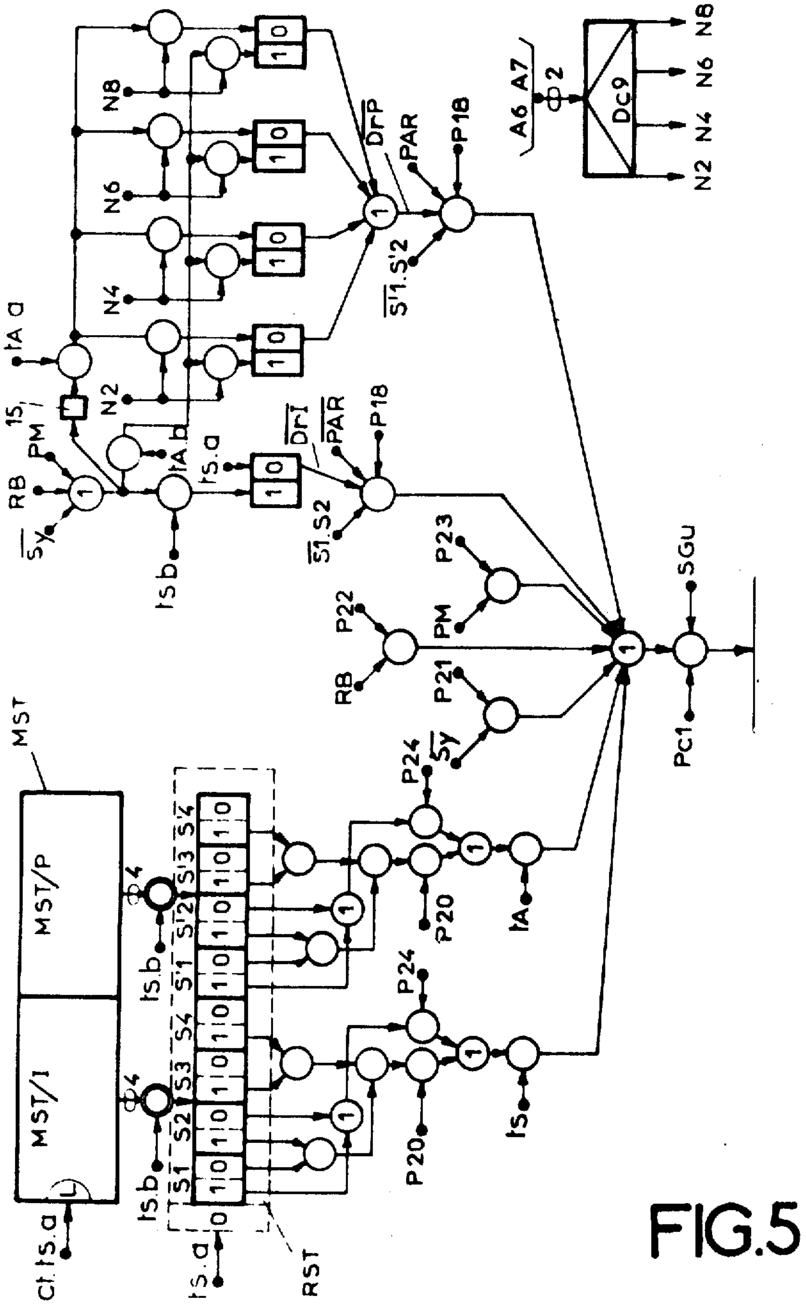
FIG. 5 represents the circuits associated to each group of trunks enabling to know the new calls, or the changes of the signalling state, or the alarms, or even the free channels.

In the case of scanning programs P20 to P24 and of the program P18, the signals resulting from the decoding of the program code are applied to circuits associated to different groups of trunks. FIG. 5 illustrates these various circuits associated to a $p$-junction group which are: the detection circuit of the new calls, the detection circuit of the changes of state of the signalling other than the new calls, the detection circuit of the trunks which are out of service, the detection circuit of the free channels corresponding to the trunks which are not out of service, this latter circuit being used during the program P18. The signals of the programs P20 to P24 as well as P18 are applied simultaneously to the whole of the group circuits of the central exchange; however, during a program, only the signals coming from a supergroup SG which is identified by a four-digit code supplied by the data processing machine (register Rg1, FIG. 8) are used. The supergroups will be called by the references SG1 to SG15 or even by the total reference SG*u*.

In the case (c) circuits enabling to detect the changes of state of the signalling signals of a *p*-junction group having each one *m* channels have been described. These circuits comprise mainly a memory $(p\times m)/2$ lines in which the information contained in one line of memory enables to process the signalling of two channels of the group considered, vizus a channel of an odd trunk and a channel of an even trunk. In the particular case described, each line of the signalling memory MST (FIG. 5) comprises two seven-digit words references S1 to S7 for the odd trunks and S'1 to S'7 for the even trunks. The digits S1 and S2 (or S'1 and S'2) are reserved to the indication of the expected signalling state, for instance, the code 01 means that the expected state is the "free" state; the digits S3 and S4 (or S'3 and S'4) are reserved to the indication of the change of state in the signalling received, for instance the code 11 means that the signal received is different from the expected signal. The meaning of the three other digits S5 to S7 (or S'5 to S'7) will not be given since they play no role in the circuit object of the present invention.

In the FIG. 5, we have only shown the flip-flops S1 to S4 and S'1 to S'4 of the register RST in which are staticized at each synchronous time slot the contents of one line of the signalling memories MST/I for the odd trunks and MST/P for the even trunks. The new calls will be detected by the condition $(S1+\overline{S2})$ S3.S4 or [(S'1+S'2) S'3.S'4]. These logical signals appear at the beginning of each synchronous time slot *t*S in all the group circuits of the central exchange but are taken into account only in the case of simultaneous presence of the signal of the program P24 (change of state) or P20 (new calls), of the signal *t*S in the case of an odd trunk and of the signal *t*A in the case of an even trunk, of the signal of selection SG*u* of the supergroup, and of the signal of the first phase P*c*1 of the program.

In the case (a), the synchronizing circuits of the signals received over a *p*-junction group have been described. It has been seen that when the synchronization code was not detected three times in succession over a trunk, the said trunk was considered as being desynchronized and a signal $\overline{Sy}$ appeared at each digit time slot *mn* reserved to the processing of a channel of this trunk. In FIG. 5, the signal $\overline{Sy}$ means that one of the trunks of the group is desynchronized, the said trunk being identified by the digit time slot *mn* during which the signal $\overline{Sy}$ appears. In the circuit object of the present invention, this signal $\overline{Sy}$ constitutes one of the three alarm signals, the two other alarm signals meaning one, referenced RB (FIG. 5) that the Alternate Mark Inversion of the message signals has been infringed in one of the trunks identified by the digit time slot in course and the other one referenced PM (FIG. 5) that the signal of the average phase of the signals received is not elaborated in one of the trunks identified by the digit time slot in course. The Alternate Mark Inversion rule concerns a certain mode of transmission of the message signals in which two successive digits 1 of one message are transmitted under the form of two pulses of different polarity. The infringement of this rule is detected in the input repeater of the incoming trunk circuit. The signal of the average phase which is elaborated in each repeater of a PCM transmission line is used for reconstituting the message signals; its absence has as consequence the impossibility of reconstituting the messages and it is foreseen to inform the data processing machine thereof.

During the program P18, it is necessary to know if the allowed outgoing channels are free and correspond to trunks which are not out of service. As it will be seen during the explanation of the process of the program P18 the alarm information must be available during two successive digit time slots, the first digit time slot must be a synchronous time slot and the second digit time slot must be an asynchronous time slot. But, each trunk of a group is processed at the digit time slot *mn* associated to this trunk, therefore the alarm signals coming from odd trunks can only appear at the odd digit time slots *mn*, i.e. at the synchronous times *t*S as shown on FIGS. 2.*b* and 2.*d*, and the alarm signals coming from the even trunks can only appear at the asynchronous time slots *t*A (FIGS. 2.*b* and 2.*e*). It is understood that in order to store the alarm signal during a synchronous time slot and during the following asynchronous time slot, it is necessary to make provision for flip-flops. In the case of four odd trunks of a group, one single flip-flop is sufficient. On the contrary, in the case of the four even trunks, the alarm signal appears only during the asynchronous part of a base time slot and it is thus necessary to make provision for one flip-flop per even trunk.

In FIG. 5, the alarm signal D*r*I of an odd trunk appears for the logical condition $(\overline{Sy}+RB+PM)$*t*S.*b* and the alarm signal D*c*P of an even trunk such as N2 appears for the condition $(\overline{Sy}+RB\pi\lambda PM)N_2\cdot$*t*A.*b*, the signal N2 coming from the decoding of the digits A6 and A7 of the clock code C*t*' by the decoder circuit D*c*9. The flip-flop corresponding to the odd trunks is reset at the beginning of each synchronous fine time slot *t*S.*a* whereas a flip-flop corresponding to an even trunk, such as N2 is only reset when the alarm signal disappears, i.e. for the condition $\overline{\overline{Sy}+RB+PM}$ (inverter circuit 15 of FIG. 5).

The fact that one channel is free and available (lack of alarm) will be detected by the condition $\overline{DrI}.\overline{S1}.S2$ for one channel of an odd trunk and by the condition $\overline{DrP}.\overline{S'1}.S'2$ in the case of an even trunk.

It has been seen, in relation with FIG. 3, that the code 0000 read in the line *x* of the synchronous and asynchronous space path memories means that no cross-point at all of the corresponding vertical was closed at the time slot *t*S*x* in the case of a synchronous memory or at the time slot *t*A*x* in the case of an asynchronous memory. It is understood that in order to know if one vertical of a switch is free it is sufficient to compare the *g* space codes contained in the two synchronous and asynchronous memories to the code 0000, the identity means then that the vertical is free at the time determined by the rank of the line read, the choice of the synchronous or asynchronous time is determined by the memory in which the code 0000 has been read.

Reversely, in order to know if one cross-point of one vertical is busy, it is sufficient to compare the space code of this cross-point to the *g* space codes contained in the two synchronous and asynchronous space path memories associated to this vertical; the identity means that this cross-point is used at the time determined, on the one hand, by the rank of the line read and, on the other hand, by the memory containing the said code.

Figure 6:
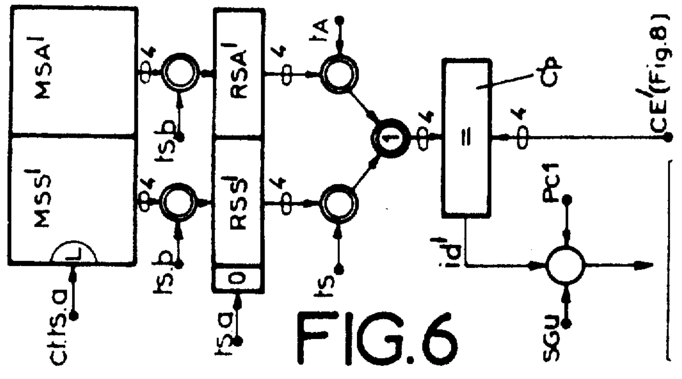
FIG. 6 represents the circuits associated to the space path memory of a junctor, the said memories corresponding to the first switching stage.

FIG. 6 represents the memories MSS' and MSA' and their associated code comparator circuit C'*p*. This figure shows that the memories are read in a cyclic way at the synchronous time slots *t*S and that the two codes read at each time slot *t*S are transferred in the registers RSS' and RSA'. The codes of the registers RSS' and RSA' are compared, respectively at the time slots *t*S and *t*A to the code CE' sent by the computer through the flip-flops 9 to 12 of the register Rg1 (FIG. 8). The result of the comparison (signal *id*') is taken into account only in the presence of the signal of selection SG*u* of the supergroup and of the signal of the first phase P*c*1 of the sequential circuit.

The mode of search of a space path in the second stage Q is identical to the one of the first stage and the corresponding circuit is similar. It comprises, as shown on FIG. 7, a code comparator C*p* which receives, on the one hand, the code CE and on the other hand the space codes supplied by the registers RSS and RSA and coming from memories MSS and MSA. Additional conditions are nevertheless foreseen over the identity signal *id*. In effect, in the FIGS. 3 and 4, it has been assumed, on the one hand, that all the inlets E' were connected to group circuits and, on the other hand, that the whole of the central exchange was controlled by a data processing machine which was able to carry out all the necessary operations for the setting up of a telephone communication such as the reception of the dialling, the updating of the memories of the junctors, the detection of the new calls, the search or the identification of a path. The circuit object of the present invention is provided, as it has been mentioned previously, for discharging the computer of the scanning operations of new calls, the scanning of the changes other than the new calls, the scanning of the alarms, the search and the identification of path. In order to discharge the computer of the operations of reception of the dialling and the up-dating of the memories of the junctors, provision is made for circuits connected in the same way as the group circuits, to inlets E' of the switching network which have thus access to the memories of the junctors through the switching network. Such circuits have been mentioned in the case (b). With respect to the circuit object of the present invention, these circuits, called "multisignallers," are considered as group circuits so that the calls coming from these units can be detected or even a free path between a multisignaller and a subscriber can be searched, the said path being then stored in the memories of the junctors. Besides, for certain operations carried out by these units at preset time slots *tw*, in particular the operations of up-dating the memories of the junctors, the path is not stored in the memories and the space codes of the cross-points are supplied directly by the said multisignaller at the time slots *tw*. These space codes are also applied to the comparator circuits C'*p* and C*p* (FIGS. 6 and 7) instead of the codes read at the time slots *tw* in the memories. It is understood that half-connections which exist in the central exchange are not all half-connections through which passes a conversation between two subscribers. Then, in order to know the type of half-connection, it is foreseen to store it. For this purpose, the junctor memory comprises two additional columns S and A (FIG. 7) which indicate if the half-connection is a conversation (signal CV) during a synchronous time slot (column S) or during an asynchronous time slot (column A). The signal CV acts on the output signal *id* of the comparator C*p*. For the program P18, the signals of identity *id* and of conversation CV cannot exist simultaneously because as soon as there is a conversation the space code is different from zero; then one has always the signal $\overline{M1}$, the signal indicating a free junctor appears for the condition $id.\overline{CV}$.

In the program P19 provided for identifying, in a first step, the junctor used at a time slot *t'x* in a conversation link and, in a second step, the time slot *t'y* of the outgoing channel used, the signal M1 appears if, on the one hand, there is identity and conversation (condition *id*.CV, FIG. 7) and if, on the other hand, the signal *id* appears at the time slot *t'x* (condition P19.$\overline{D'e}$. ID.SJ.*v*.P*c*1, FIG. 7). This signal M1 is stored in an additional column of the data memory of junctors MDJ in the line selected at this instant, the said line selected being the line *x* if the time slot *t'x* is synchronous or a line *z* the code C*z* of which has been read at the synchronous time slot *t*S*x* in the time memory MCT if the time slot *t'x* is asynchronous. If the time slot *t'x* is synchronous, the line *x* of the memory MDJ will be again selected at an asynchronous time slot *t*S*y* which is the searched time slot. If the time slot *t'x* is asynchronous, the line *z* of the memory MDJ will be again selected at the synchronous time slot *t*S*z* which is the searched time slot.

It will be noticed that if the time slot *t'x* is asynchronous, the synchronous time slot *t*S*z* is given directly by the code C*z* read at the synchronous time slot *t'x* in the memory MCT.

Figure 7:
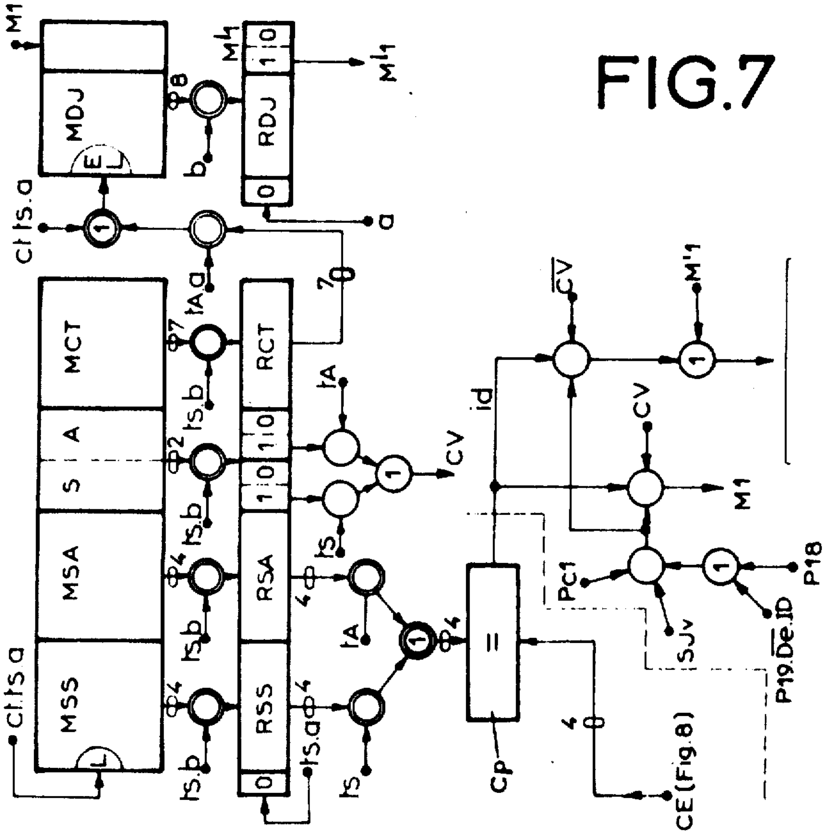
FIG. 7 represents the circuits associated to the space path memories of the junctor, the said memories corresponding to the second switching stage.

The circuit of FIG. 5 is associated to a group of *p*-trunks and the circuits of FIGS. 6 and 7 are associated to a junctor; the information signals which they supply are staticized in the register RG (FIG. 9) in what concerns the information coming from the circuit of FIG. 5 and in the registers RM and RJ (FIG. 9) in what concerns the information coming respectively from the circuits of FIGS. 6 and 7. Each register comprises 15 flip-flops which enable to staticize the 15 information coming from a supergroup or from a superjunctor. These three registers are cleared at the fine time slot *c* of each digit time slot and written at each ultrafine time *d*2 of the first phase P*c*1 of a program. The state signals of these registers are applied to AND circuits controlled by the signals of program, the identity signals ID*r* and ID'*r*, the signals of selection E'1 to E'15 of one of the groups, the signals of selection L'1 to L'15 of one of the links. The circuit of FIG. 9 enables to process the information contained in the registers RG, RM and RJ in order to obtain a clock code and a space code. Thus, in the case of a scanning program of new calls, this new call is identified by the time slot *t'x* during which it is detected and by the space code of the group from it comes.

Each program comprises three phases which are elaborated through a sequential circuit PC illustrated by FIG. 10. It comprises the flip-flops 13 to 16 of the register R*g*5 of FIG. 8 in which the computer writes the code 1000 at the beginning of each program. At the fine time slot *a*, the digits 13 and 14 are transferred in a register R*g*10 associated to a decoder circuit D*c*7 supplying the phase signals P*c*0 to P*c*3; table 4 gives the correspondence with the codes. The passage from one phase to the following one is controlled by the signals VA and VG resulting from the state of the logical circuit of FIG. 9. The modification of the digits 15 and 16 is obtained by signals resulting from the time conditions provided for limiting the time of each program; thus the signal D*e* appears when certain clock codes are detected and the signal F*i* appears when the same clock code is detected provided the first signal D*e* should have already appeared. These codes will be defined in the course of the description of the operation mode of the programs.

TABLE 4

| Codes | Phases | Meaning |
|---|---|---|
| 00 | Pc0 | None. |
| 10 | Pc1 | Scanning. |
| 11 | Pc2 | Choice of the space code. |
| 01 | Pc3 | Completed program. |

The operation mode of the various programs the meaning of which is summarized in table 2 will be now described.

Program P20

The aim of this program is to detect the new calls. For this purpose the data processing machine supplies the following information:

the code of the program P20, the code of the supergroup SG*u* to which we are interested, the code of the mask forbidding certain groups, the code corresponding to the phase P*c*1.

At each synchronous time slot, the 15 information concerning the odd trunks (FIG. 5) of the supergroup SG*u* are staticized in the register RG (FIG. 9), the 15 information concerning the even trunks are staticized at each asynchronous time slot. This information is transferred in the register R*g*6, previously cleared by the signal P*c*3.*b* of the preceding program, through the series of AND circuits SE1 controlled by the signal P20, the series of OR circuits S01 and the series of AND circuits SE4 controlled by the signal P*c*1.*b*. The outputs of the registers R*g*6 are connected to the series of AND circuits SE5 the two other inputs of which receive, on the one hand, the signals of mask M1 to M15 and, on the other hand, the output signals of the register R*g*8 all the flip-flops of which are in the 1 state by the signal P18.P*c*1.*b*. If at any time slot *t'x* a channel is calling in a group allowed by the mask, one of the AND circuits SE5 is opened and supplies a signal VA which, through the OR circuit 1, the inverting circuit 2 and the multiple AND circuit 10, prevents at the ultrafine time slot P*c*1.*d*1 the writing of the clock code C*t'x*+1 in the register R*g*7; the clock code C*t'x* which is staticized identifies the calling channel in a group. In order to determine the group or for selecting one of the possible groups if there are several channels from one supergroup which are calling at the same time slot *t'x*, it is provided a selection circuit comprising the register R*g*9; the decoder Dc8 of the four digits A5 to A8 of the clock codes, the AND circuits SE6 the two inputs of which are connected on the one hand to the outputs of the AND circuits SE5 and on the other hand to the outputs H1 to H15 of the decoder Dc8.

Through the AND circuit 11 (FIG. 10) controlled by the signal Pc1, the output signal VA of the OR circuit 1 (FIG. 9) elaborates the passage signal to the phase Pc2 (FIG. 10) during which the one of the calling groups is chosen. When one of the AND circuits SE6 opens, its position and thus the group to which it corresponds are determined by the output H of the decoder Dc8 which is energized at this instant; the code of group is thus the code formed by the digits A5 to A8 of the clock code Ct' at this moment; the said digits are transferred in the register Rg9 at the ultrafine time slot Pc2.d1 through the multiple AND circuit 6 controlled by the output signal VG of the OR circuit 5. The output signal VG of the OR circuit 5 controls also the shifting to the phase Pc3' (condition VG.Pc2.d, FIG. 10). The results of this search of new calls, vizus the identity of the channel (register Rg7) and of the group (register Rg9) are transferred respectively in the flip-flops 1 to 8 and 9 to 12 of the register Rg5 (condition Pc3.$\overline{Fi}$, FIG. 9).

In the case where no channel at all is calling in an allowed group, it is foreseen to limit the duration of the search to less than two complete cycles. For this purpose, provision is made for elaborating a signal De when a certain clock code Ct'c, chosen beforehand, is detected during the phase Pc1 (condition P20+P24).Ct'c.Pc1, FIG. 10), to elaborate thereafter a signal Fi where the code Ct'c appears a second time during the phase Pc1 (condition (P20+P24).Ct'c.Pc1.De, FIG. 10), and to shift to the final phase Pc3 if no calling channel has been detected (condition Pc1.Fi.$\overline{VA}$; FIG. 10).

Program P24

The aim of this program is to detect the changes of state of the signalling which do not correspond to new calls and is identical to the program P20 described hereabove.

Programs P21, P22, P23

The aim of these programs is to detect whether a trunk of any of the supergroup SGu is out of service and cannot therefore be used.

For this purpose, the data processing machine supplies the following information:

- the code of one of the programs P21, P22 or P23,
- the code of the supergroup SGu to which we are interested,
- the code of the mask forbidding certain groups,
- the code corresponding to the phase Pc1,
- the code of the trunk to which we are interested,
- the code of the mask of the channels constituted by the digits 1 only.

At each synchronous and asynchronous time slots, the alarm information corresponding to one of the three programs are written in the register RG; they are transferred in the register Rg6 only when the presence of the identity signal ID'r is applied to the AND circuits SE2. In this manner, only the alarm signal corresponding to the trunk specified in the programs is taken into account.

The processing of the information is then identical to the one described in relation with the program P20. Then, the signal VA appears if the trunk is in alarm in any one of the groups and the code of this trunk is given by the digits A6, A7 and A8 of the clock code staticized in the register Rg7, the code of the group is the one contained in the register Rg9.

At the beginning of a program, the clock code is any one and in particular the three less significant digits A6, A7 and A8 which give the code of trunk do not correspond in general to the trunk to which we are interested. Then, it is necessary to provide for a search time which enables to scan at least once all the trunks. The signal De appears then when a certain code Ctj formed by the digit A6 to A8 of the clock code is detected a first time and the signal Fi appears for the second occurrence of this code Ctj.

Program P16

The aim of this program is to search a free link or to identify a busy link between a switch Q'u and a switch of the second stage Q at a given time slot t'x synchronous or asynchronous in the case where each circuit of group is connected to two inlets of a switch. The data processing machine supplies the following information:

- the code of the program P16,
- the code of the switch Q'u, i.e. in fact the code of the supergroup SGu; owing to the grouping of the memories (FIG. 4), the memories MSS' and MSA' are in the superjunctor SJu,
- the time code Ct'x limited by the signal $\overline{P16}$ (FIG. 9), to the seven most significant digits since the inlet E' of the switch Q'u may be used selectively in synchronous or asynchronous time slot if it is assumed that each group is connected to two inlets of a switch,
- the code of mask of the links,
- the code of the phase Pc1 of the sequential circuit,
- the code 0000 for a search (or the code CE' of the inlet E' for an identification) in the flip-flops 5 to 8 of the register Rg1.

At each synchronous time slot, the code 0000 (or CE') is compared to the space code read at this time slot in the memory MSS' and, at each asynchronous time slot, the said code is compared to the space code read at the preceding synchronous time slot in the memory MSA' (FIG. 6). The results of these comparisons corresponding to the memories MSS' and MSA' associated to the switch Q'u are transferred in the register RM (FIG. 9); they are taken into account only during the presence of the signal IDr (AND circuits SE7), the said signal having a duration of a base time slot since only the seven most significant digits of the code Ct'x and of the clock code Ct' are compared.

At the output of the AND circuits SE7, the information follows the same processing as during the program P20; thus, if one of the links allowed by the mask is free (or identified), the signal VA appears and the code displayed by the register Rg7 (FIG. 9) gives the code of the channel in the group, i.e. the synchronous and asynchronous time slot; the code of the free link L' (or identified) is given by the register Rg9.

The processing time of the information in the case where there is no result is limited to the duration of the signal IDr in this particular case, i.e. a base time slot. The signal De appears for the condition (P16+P17).IDr.Pc1, (FIG. 10) and the signal Fi for the condition (P16+P17).De.tA.Pc1, (FIG. 10).

Program P17

This program is identical to the program P16, but is applied in the case where each group circuit is connected to one single input of the switch. The time code Ct'x comprises then eight digits so that the signal IDr lasts only a digit time slot.

Program P18

The aim of this program is to search a free path between a free inlet E at a time slot t'x of a switch Qv and one of the outgoing channels which are allowed and free of a trunk connected to an inlet E'w of a switch Q'u. All the junctors, connected to the switch Qv, which are free at the time slot t'x are determined first then it is determined if one of the allowed outgoing channels of a trunk connected to the inlet E'w, if the link L'uv which connects the switches Qv and Q'u and if junctors of the superjunctor SJv are free simultaneously at one of the allowed time slots which will be called t'y, last it is determined if the free junctor at the time slot t'y is also free at the time slot t'x.

This program P18 is the continuation of the program P16 (or P17) which has enabled to determine the free link L' at the time slot t'x; with this code of free link, the computer, which is assumed to know the interconnection between the two stages, determines the switch Qv to which this free link is connected. For the program P18, the data processing machine supplies then the following information:

- the code of the switch Qv to which is connected the free link determined by the program P16 (or P17), i.e. the code of the superjunctor SJv,
- the code of the program P18,
- the code of the input E'w to which the allowed outgoing channels are connected, the code of the switch Q'u to which is connected the input E'w, the code of the link L'uv of the switch Q'u which is connected to the switch Qv, this code is determined by the data processing machine from the interconnection diagram between the two stages. In the case where there are several links L'uv connecting the switches Q'u and Qv, it is clear that the data processing machine will supply the codes of the said links L'uv, each one of the said codes being used in turn if the search is not successful.

the code of mask of the allowed junctors, the code of mask of the allowed outgoing channels, the code of the trunk to which belong the allowed outgoing channels, the time code Ct'x during which the link, determined by the program P16 (or P17), is free, the code 0000 in the flip-flops 5 to 8 of the register Rg1, the code of the phase Pc1 of the sequential.

At each synchronous time slot, the code 0000 is compared to the space code read at this time in the memory MSS and at each asynchronous time slot the said code is compared to the space code read at the preceding synchronous time slot in the memory MSA. The results of these comparisons, corresponding to the memories MSS and MSA associated to the switch Qv, are transferred in the register RJ (FIG. 9); they are taken into account only at the time slot t'x, i.e. during the presence of the signal IDr applied to the AND circuits SE11. The information of free junctors at the time slot t'x is stored in the register Rg8. If one of the junctors is free, in which case the OR circuit 7 supplies a signal of opening of the AND circuits SE10, one shifts to the following step of the search which consists in searching if, at each allowed time slot, one of the allowed outgoing channels, the link L'uv and junctors of the superjunctor SJv are free simultaneously. During this step, the register RM receives the results of the comparisons between the code 0000 and the space codes of the memories MSS' and MSA' associated to the switch Q'u; this information of free links is compared, in the AND circuits SE8, to the code 1 among 15 identifying the link L'uv which connects the switch Q'u, to which are connected the allowed outgoing channels, to the switch Qv, to which is connected the free link determined by P16 (or P17); if the identity exists, the OR circuit 9 supplies an opening signal of the AND circuits SE10.

The register RG receives, during the program P18, the information of free channels, a channel being considered as free if the expected signalling state corresponds to free state (condition S1.S2 for the odd junctions, FIG. 5) and if the trunk is not in alarm condition (condition Drl for the odd trunks, FIG. 5).

When the allowed trunk is odd, it is sufficient to take into account only the information coming from the odd trunks; in the same way, when the allowed trunk is even, it is sufficient to consider only information coming from even trunks. This choice is carried out by means of the less significant digit of the code of the trunk allowed, the said digit being staticized in the flip-flop 27 of the registers Rg3–Rg4 (FIG. 8). The state signal PAR of this flip-flop is equal to 0 if the allowed trunk is odd and equal to 1 if the allowed trunk is even.

As a result of the use of flip-flops for storing the alarm signals (FIG. 5), the signal of free channel appears during a base time slot since it is possible to set up the half-link either during a synchronous time slot, or during an asynchronous time slot (case of each group connected to two inlets of a switch); the choice between these two solutions synchronous or asynchronous for the time slot t'y is directed by the time slot t'x; thus, if t'x is synchronous, t'y will be asynchronous and reversely. This choice is obtained by applying to the comparator Cp1 (FIG. 8) the complement to the less significant digit A'8 of the code Ct'x instead of the signal PAR. The information of free channels is compared through the AND circuits SE3, to the code 1 among 15 (signal E'w), identifying the input E'w to which the allowed outgoing channels are connected. If there is indentity, the OR circuit 8 supplies the opening signal of the AND circuits SE10. If at an allowed time slot t'y (signal ID'r), the link L'uv is free and if it exists a free outgoing channel, the contents of the register RJ is transferred to the register Rg6.

If it exists one or several free junctors, the third step consists then to search a junctor which is at the same time free in t'x *and in* t'y. For that purpose, the contents of the registers Rg6 and Rg8 as well as the mask Ml to M15 of the allowed junctors are compared through AND circuits SE5. The choice of one of the junctors is performed in the same manner as during the other programs. If it exists a free path, the time code is given by the register Rg7.

In order to limit the search time, the signal De (FIG. 10) is elaborated when the code Ct'x appears for the first time (condition P18+P19).IDr.Pc1, FIG. 10) and the signal Fi is elaborated when the code Ct'x appears for the second time (condition P18+P19).IDr.Pc1.De), which means that all the possible cases have been scanned, including the case where the time t'y which is searched correspond to the same base time slot as the time slot t'x given.

Program P19

The aim of program P19 is to identify the junctor and the time slot t'y used for connecting at the time slot t'x a link with an outgoing channel; this program follows normally the program P16 (or P17). The information which are supplied by the data processing machine are the following:

the code of the switch Qv to which is connected the link identified by the program P16 (or P17), the code of the program P19, the code of the mask of the allowed junctors, the time code Ct'x during which the link, determined by the program P16 (or P17) is busy, the code CE of the input E of the switch Qv to which is connected the link identified by the program P16 (or P17); this code is staticized in the flip-flops 5 to 8 of the register Rg1, the code of the phase Pc1 of the sequential.

At each synchronous and asynchronous time slot, the code CE of the input E of the switch Qv is compared respectively to the space codes of the memories MSS and MSA of the superjunctor SJv; however the signal resulting from a comparison is taken into account only at the time slot t'x (condition P19.De.ID, FIG. 7). If at the time slot t'x (condition P19.$\overline{De}$.ID, FIG. 7) there is identity between the two codes and if a conversation is in course (signal CV, FIG. 7), on the one hand, a digit 0 is staticized in the register RJ and, on the other hand, a digit 1 is stored in the location M1 of the speech memory of the junctor and in the line selected at this time slot in the said memory. On the contrary, if there is identity but not conversation, on the one hand, a digit 1 is staticized in the register RJ and a digit 0 is stored in the location M1 of the memory MDJ. The digit 1 which appears at the time slot t'x in the register RJ means that the half-link is not a conversation half-link and the program P19 is over. As it has been explained in relation with FIG. 7, if a conversation half-link is involved and if the time slot t'x is synchronous, the digit M'1=1 will be read at the asynchronous time slot t Ay which is the searched time slot; reversely, if the time slot t'x is asynchronous, the digit M'1=1 will be read at the synchronous time slot tSy. As soon as the digit M'1=1 is written in the register RJ, the signal VA appears and the time code t'y searched is displayed in the register Rg7. The register Rg9 gives thereafter the identity of the junctor in the superjunctor SJv which has supplied the digit M'1 1, i.e. the junctor used for the connection.

The scanning time of the digit M1 in the junctors is limited to the time interval between two clock time slots t'x; this time interval is detected by the conditions De=P18+P19).IDr.Pc1 and Fi=(P18+P19).IDr.Pc1.De. In order that the signal M1 may appear only once in the course of the program, it appears only for the condition P19.$\overline{De}$.ID.

Figure 12:
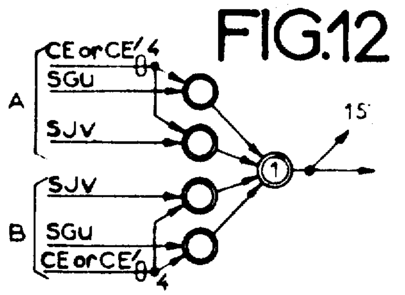
FIG. 12 represents a circuit for sending space codes when it is foreseen to use two scanning and path search circuits.
Figure 13:
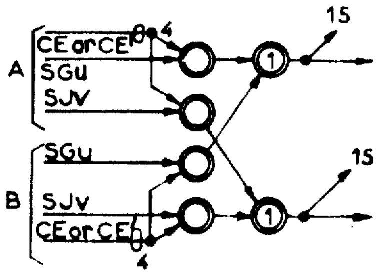
FIG. 13 represents another circuit for sending space codes when it is foreseen to use two scanning and path search circuits.

For reasons of safety of operation of the control exchange, provision is made for using two scanning and searching circuits which will be called A and B, each circuit A or B comprising the circuits of FIGS. 8, 9, 10 and 11, the circuits associated to all the signalling memories an example of achievement of which is shown on FIG. 5, the logical circuits associated to the output of all the comparators $Cp$ and $C'p$, the circuits sending the space codes to all the comparators examples of achievement for a superjunctor of which are shown on FIGS. 12 and 13.

If the circuit sending the space codes is the one of FIG. 12, the said circuit enabling to send the space code to all the comparators $C'p$ and $Cp$ of a superjunctor defined by the signal $SGu$ or $SGv$ supplied by the decoders $Dc3$ and $Dc4$ of FIG. 8, the possible ways of operation of the circuits A and B are the following ones:

1. The circuits A and B may operate each one on turn;
2. The circuits A and B may put into operation simultaneously the same programs or different programs which concern the processing of information coming from supergroups, i.e. the programs P20 and P24, and this in a same supergroup, or in different supergroups. They may also put into operation simultaneously the programs P16 (or P17) and P18 concerning a path search since the space codes which are sent are always constituted by zeros. On the contrary, they cannot put into operation simultaneously the programs P16 (or P17) and P19 concerning a path identification only in different superjunctors since the space codes which are sent are in general different.

If the circuit sending the space codes is the one of FIG. 13, the said circuit enabling to send the space codes CE' to the comparators $C'p$ and the space codes CE to the comparators $Cp$, the circuits A and B may then put into operation simultaneously the programs P16 (or P17) and P19 concerning a path identification in a same superjunctor.

If, instead of having circuits A and B having common comparators, each circuit A and B comprises the comparators $C'p$ and $Cp$, the said circuits A and B are then independent and a program P16 (or P17) and a program P19 may be put into operation simultaneously in the two circuits A and B.

While the principles of the present invention have been described in connection with specific embodiments and particular modifications thereof it is to be clearly understood that this description is made by way of example and not as a limitation of the scope of the invention.

We claim:

1. A time division multiplex data switching central exchange operating in pulse code modulation in which the operations are controlled by a data processing machine; the said switching central exchange comprising a switching network; circuits for a group of $p$-trunks, where $p$ is the number of digits of each channel message, connected to the inlet of the switching network and provided for carrying out on reception a series-parallel conversion and, on transmission, a parallel-series conversion of the digits of the messages of channels of $p$-trunks; circuits of detection and interpretation of the signalling digits associated with each circuit of a group of $p$-trunks comprising mainly a signalling memory in which are stored for each channel of the group the state of the expected signalling and the indication of the change, if any, of the signalling state with respect to the expected state; junctor data memories connected to the outlet of the switching network; each junctor comprising, in addition to a data memory, a time path memory and space path memories for setting up a connection between two channels; the said memories being updated by the data processing machine in relation with communications in course; a clock circuit provided for supplying cyclic signals; said scanning and path search device controlled by the data processing machine for processing the signals supplied by circuits associated with the circuits of group of trunks, with the signalling memories and with the space path memories; said scanning and path search device detecting the alarm signals from the trunks, the new calls and the other changes of state of the signalling as well as the search for a free path and the identification of busy connections.

2. A data switching central exchange according to claim 1 in which the scanning and path search device is characterized by the fact that in each circuit of a group the alarm signals of the trunks appear at each digit time slot during which is processed a channel belonging to the said trunk; by the fact that the signalling memories are read in a cyclic way and the signals read are applied to logical circuits which detect for each channel of a group the new calls and the other changes of state of the signalling; by the fact that the space path memories are read in a cyclic way and the space codes read are applied to a comparator which receives on the other hand the space code supplied by the data processing machine, the said space code identifying a cross-point of the switching network in the case of an identification of a busy connection or which does not correspond to any cross point at all in the case of a search of a free path; by the fact that circuits are provided for storing and decoding the information necessary for the operation of the scanning and search path device, the said information being supplied by the data processing machine; by the fact that the signals supplied by circuits of group are connected to a same switch; by the fact that logical circuits associated with the signalling memories corresponding to the circuits of a group connected to a same switch; and by the fact that comparators associated with the space path memories of the junctors connected to a same switch are applied to a sequential logical circuit which determines the time and space coordinates of the trunk in alarm or of the calling channel, or of the channel which changes its state without being calling or of the free path or of the busy connection to be identified.

3. A data switching central exchange according to claim 1 in which the codes of masks are supplied by the data processing machine; the said codes of masks enabling, in the sequential logical circuit, to take into account only the alarm signals coming from certain circuits of groups of trunks of a supergroup or the signals of changes of state coming from logical circuits associated to certain signalling memories of a supergroup, or the identity signals coming from comparators associated to certain space path memories of a superjunctor or the signals concerning certain channels.

4. A data switching central exchange according to claim 1, in which the sequential logical circuit is characterized by the fact that the duration of a scanning concerning the alarms, or the new calls or the changes of state other than the new calls as well as the duration of a search for a free path or the identification of a busy link is limited.

5. A data switching central exchange according to claim 1, in which the switching network comprises two stages characterized by the fact that the search of a free path between two calling channels at the time slot $t'x$ and one of the allowed outgoing channels at the time slots $t'y$ defined by a code of mask is carried out in two parts; the first part consisting in searching a free link between the two stages of the switching network at a time slot $t'x$, the second part consisting in searching a free junctor at a time slot $t'x$ and at one of the time slots $t'y$ as well as a free link and a free outgoing channel at a time slot $t'y$ during which the junctor, which is free at the time slot $t'x$, is also free.

6. A data switching central exchange according to claim 1, in which the switching network comprises two stages characterized by the fact that the identification of the path used for a connection with an incoming channel at the time slot $t'x$ is carried out into two parts, the first part consisting in identifying link used at the time slot $t'x$ and the second part consisting in identifying the junctor used as well as the time slot $t'y$ of the outgoing channel.